United States Patent
Bango (10) Patent No.: US 10,731,313 B1
(45) Date of Patent: Aug. 4, 2020

(54) RETAINING WALL ASSEMBLY

(71) Applicant: Homebridge Precast, LLC, Ann Arbor, MI (US)

(72) Inventor: Anthony Bango, Ann Arbor, MI (US)

(73) Assignee: Homebridge Precast, LLC, Ann Arbor, MI (US)

(*) Notice: Subject to any disclaimer, the term of this patent is extended or adjusted under 35 U.S.C. 154(b) by 0 days.

(21) Appl. No.: 16/522,698

(22) Filed: Jul. 26, 2019

(51) Int. Cl.
  *E02D 29/02* (2006.01)
  *E01F 5/00* (2006.01)
  *F16L 3/127* (2006.01)

(52) U.S. Cl.
  CPC .......... *E02D 29/0266* (2013.01); *F16L 3/127* (2013.01); *E02D 2250/00* (2013.01); *E02D 2300/002* (2013.01)

(58) Field of Classification Search
  CPC ....... E01F 5/005; E02D 29/0266; F16L 3/127
  See application file for complete search history.

(56) References Cited

U.S. PATENT DOCUMENTS

| | | | | |
|---|---|---|---|---|
| 915,266 | A * | 3/1909 | Boyd | E01F 5/005 |
| | | | | 405/125 |
| 961,908 | A * | 6/1910 | Storms | E01F 5/005 |
| | | | | 405/125 |
| 1,213,916 | A * | 1/1917 | Souder | E01F 5/005 |
| | | | | 405/125 |
| 1,228,662 | A | 6/1917 | Good, Jr. | |
| 2,636,352 | A | 4/1953 | Alger | |
| 2,958,200 | A * | 11/1960 | Russell | E01F 5/005 |
| | | | | 405/125 |
| 3,777,786 | A * | 12/1973 | Gray | E01F 5/005 |
| | | | | 138/109 |
| 3,779,021 | A | 12/1973 | Green | |
| 3,981,153 | A * | 9/1976 | Bleek | E01F 5/005 |
| | | | | 405/124 |
| 5,236,975 | A | 8/1993 | Sukeyoshi | |
| 5,293,724 | A * | 3/1994 | Cornwall | E03F 5/041 |
| | | | | 285/139.1 |
| D447,543 | S | 9/2001 | Quin | |
| 6,533,498 | B1 | 3/2003 | Quin | |
| 6,644,889 | B2 * | 11/2003 | Hartman | E01F 5/005 |
| | | | | 405/125 |
| 6,874,974 | B2 | 4/2005 | VanBuskirk | |
| 7,001,110 | B2 | 2/2006 | Lockwood | |

(Continued)

OTHER PUBLICATIONS

HartmanEW Brochure; Hartman Products, hartmanendwalls.com; USA (4 pages).

(Continued)

*Primary Examiner* — Benjamin F Fiorello
(74) *Attorney, Agent, or Firm* — Bejin Bieneman PLC (57) ABSTRACT

A retaining wall assembly includes a concrete retaining wall including a bore, and a cylindrical tube fixed in the bore and sized to fixedly fit to a culvert pipe. The cylindrical tube includes a tube body and a flange extending radially outward from the tube body, and the flange is embedded in the retaining wall. The cylindrical tube, when fixedly fit inside the culvert pipe, supports a full weight of the retaining wall. A method of installing the retaining wall to the culvert pipe includes providing the retaining wall assembly, fixedly fitting the cylindrical tube to the culvert pipe, and providing only native soil directly below a bottom edge of the retaining wall.

18 Claims, 5 Drawing Sheets

(56) References Cited

U.S. PATENT DOCUMENTS

| | | |
|---|---|---|
| 8,523,486 B2 | 9/2013 | Aston et al. |
| D795,992 S | 8/2017 | May |
| 9,822,498 B2 | 11/2017 | Von Handorf et al. |
| 10,012,338 B2* | 7/2018 | Kincheloe ................. E03F 5/06 |
| 10,047,486 B2 | 8/2018 | Denham et al. |
| 10,174,468 B2 | 1/2019 | Eby |
| 2004/0081517 A1 | 4/2004 | Hartman |
| 2005/0218648 A1* | 10/2005 | Logue, Jr. ................. F16L 5/02 |
| | | 285/18 |
| 2005/0260039 A1* | 11/2005 | Kurdziel ................. E01F 5/005 |
| | | 405/125 |
| 2006/0049627 A1* | 3/2006 | Happel ..................... F16L 5/02 |
| | | 285/230 |
| 2006/0208480 A1* | 9/2006 | Happel ............... B28B 23/0043 |
| | | 285/230 |
| 2015/0063924 A1* | 3/2015 | Brookhart ........... E02D 29/0266 |
| | | 405/284 |
| 2016/0178101 A1* | 6/2016 | Blake ................. A61M 39/1011 |
| | | 285/417 |

OTHER PUBLICATIONS

Introducing The HartmanEW System; Hartman Products, hartmanendwalls.com (28 pages).

Standard Landscape Cover—Culvert Pipe Covers; http://www.culvertpipecovers.com/product/standard-15-culvert-pipe-landscape-cover/; printed May 13, 2019 at 5:40pm; copyright 2016 by Culvert Pipe Landscape Covers (3 pages).

* cited by examiner

RETAINING WALL ASSEMBLY

BACKGROUND

A culvert is a structure for water to flow from one side of an obstruction to the other side of the obstruction. For example, culverts can connect ditches on either side of a road, railroad, trail, etc. Culverts can be in the form of a pipe made of plastic or metal, concrete, or another material.

DETAILED DESCRIPTION

With reference to the Figures, a retaining wall assembly 30 includes a concrete retaining wall 32 including a bore 34, and a cylindrical tube 36 fixed in the bore 34 and sized to fixedly fit to a culvert pipe 38. The cylindrical tube 36 includes a tube body 40 and a flange 42 extending radially outward from the tube body 40. The flange 42 is embedded in the retaining wall 32. The cylindrical tube 36, when fixedly fit inside the culvert pipe 38, supports a full weight of the retaining wall 32. A method of installing the retaining wall 32 to the culvert pipe 38 includes providing the retaining wall assembly 30, fixedly fitting the cylindrical tube 36 to the culvert pipe 38, and providing only native soil directly below a bottom edge 44 of the retaining wall 32.

The retaining wall assembly 30 can provide an attractive appearance for an area surrounding the culvert pipe 38 while being easy to install to the culvert pipe 38. The retaining wall assembly 30 is light enough that one or two individuals can lift the retaining wall assembly 30 without using heavy machinery. The weight of the retaining wall assembly 30 helps easy installation and permits installation by nonspecialists. Further, the retaining wall assembly 30 does not require gravel or load-bearing materials below; rather, native soil can be used, further making installation easy and reducing materials needed for installation. The retaining wall assembly 30 can prevent erosion by retaining the native soil behind the retaining wall 32.

Figure 1:
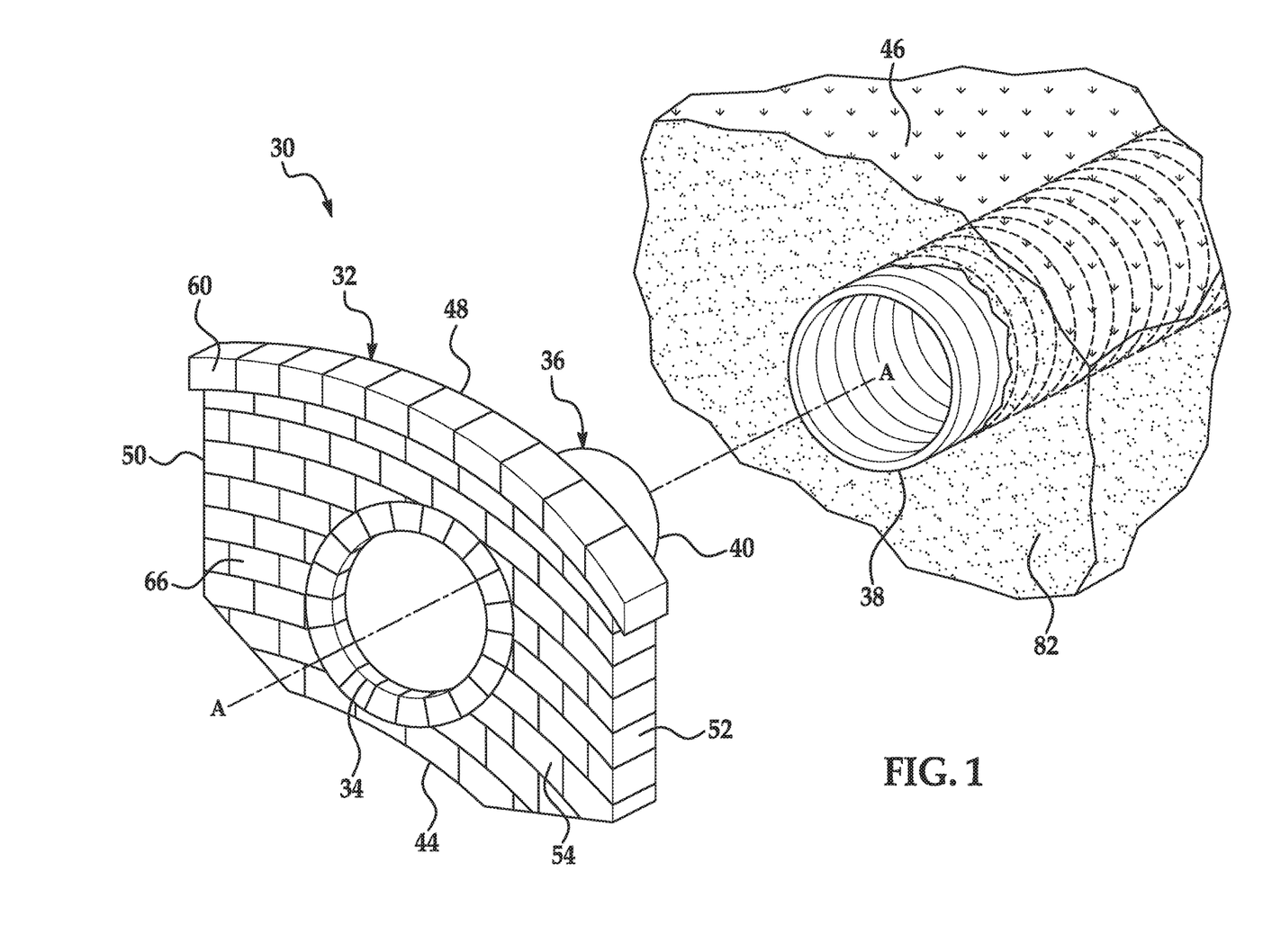
FIG. 1 is a perspective exploded view of a retaining wall assembly and a culvert pipe.
Figure 2:
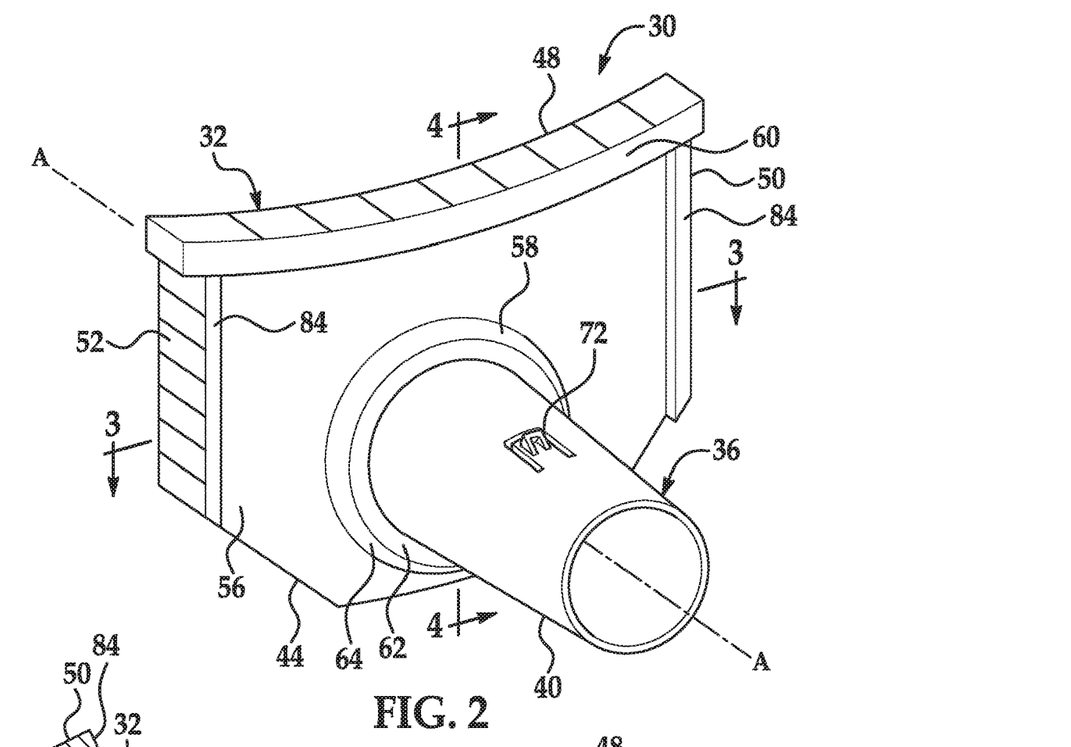
FIG. 2 is a rear perspective view of the retaining wall assembly.

With reference to FIG. 1, the culvert pipe 38 is a pipe installed to permit water to flow under an earthen obstruction 46, e.g., a road, railroad tracks, a path, and so on, from one side of the obstruction 46 to the other side of the obstruction 46. The culvert pipe 38 is a pipe formed of, e.g., metal such as aluminum or galvanized steel, plastic such as high-density polyethylene (HDPE) or polyvinyl chloride (PVC), concrete, etc. The culvert pipe 38 is typically corrugated. The culvert pipe 38 is typically one of a set of standard sizes, i.e., standard diameters.

Figure 3:
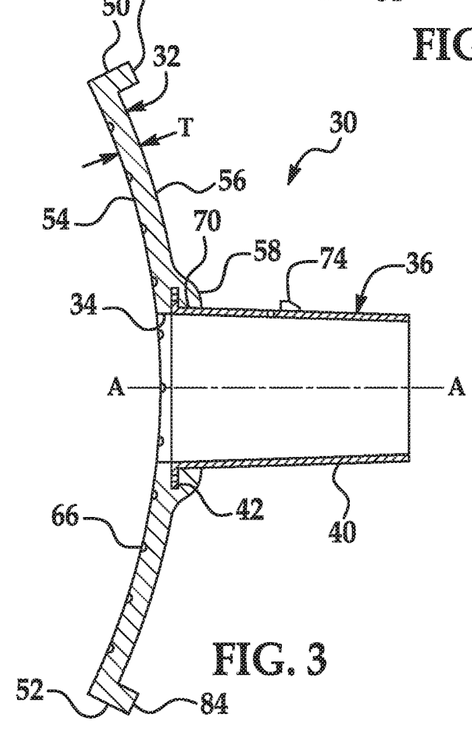
FIG. 3 is a top cross-sectional view of the retaining wall assembly and the culvert pipe.
Figure 4:
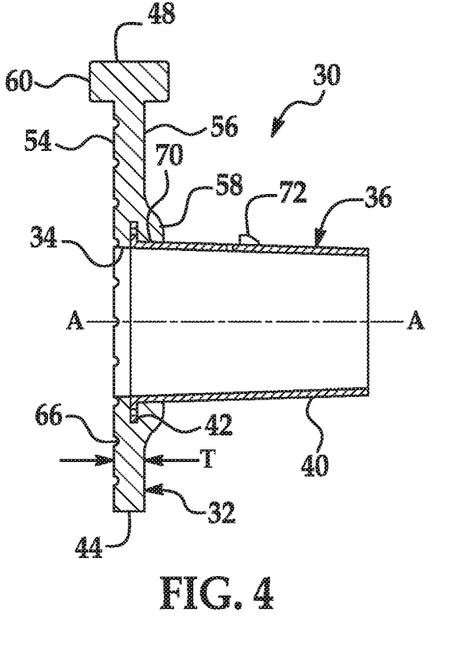
FIG. 4 is a side cross-sectional view of the retaining wall assembly and the culvert pipe.

With reference to FIGS. 1-4, the retaining wall 32 extends from a top edge 48 to the bottom edge 44 and from a left edge 50 to a right edge 52. The top edge 48, the left edge 50, and the right edge 52 can be straight. The bottom edge 44 can be closer to the top edge 48 in a vertical direction at the left edge 50 and right edge 52 than in a middle of the retaining wall 32; i.e., the bottom edge 44 can be curved or angled upward toward the left edge 50 and toward the right edge 52; i.e., a height of the retaining wall 32 is taller toward the middle than toward the left edge 50 and than toward the right edge 52. The retaining wall 32 is straight in a vertical direction, i.e., straight from along a vertical cross-section from the bottom edge 44 to the top edge 48, as best seen in FIG. 4. The retaining wall 32 can be curved in a horizontal direction, i.e., from the left edge 50 to the right edge 52. The retaining wall 32 includes an exposed surface 54 facing away from the obstruction 46 when the retaining wall assembly 30 is installed, and the retaining wall 32 includes a covered surface 56 facing into the obstruction 46 when the retaining wall assembly 30 is installed. If the retaining wall 32 is curved in the horizontal direction, the exposed surface 54 is concave and the covered surface 56 is convex. Alternatively, the retaining wall 32 can be straight in the horizontal direction.

The retaining wall 32 is concrete. For the purposes of this disclosure, "concrete" is defined as a composite material compose of fine and coarse aggregate bonded together with hardened fluid cement. In particular, the retaining wall 32 can be glass-fiber-reinforced concrete (GFRC). GFRC includes alkali-resistant glass fibers embedded in a concrete matrix. The glass fibers provide most of the load-carrying of the GFRC, and the concrete matrix keeps the glass fibers in the same location and orientation and protects the glass fibers from the environment. The retaining wall 32 is a single piece having a continuous internal structure with no internal seams.

The use of GFRC can permit a smaller thickness T of the retaining wall 32 while maintaining the strength of the retaining wall 32, contributing to the low weight of the retaining wall assembly 30. The thickness T at a point of the retaining wall 32 is the shortest distance between the exposed surface 54 and the covered surface 56. The retaining wall 32 has a constant thickness T other than at a collar 58 (described below and best seen in FIG. 2), at a top ledge 60, and at outer lips 84. The thickness of the retaining wall 32 at the collar 58 is greater than the thickness T. The thickness T can be no greater than 4 inches; in other words, the retaining wall 32 can be a thin-shell GFRC structure. For example, the thickness T can be approximately 1 inch. The retaining wall 32 can lack any internal reinforcing beams or structure (other than the cylindrical tube 36 and the glass fibers of the GFRC).

The top ledge 60 extends from the left edge 50 to the right edge 52 along the top edge 48. The top ledge 60 has a thickness greater than the thickness T. The thickness of the top ledge 60 can also be no greater than 4 inches, e.g., 4 inches. The top ledge 60 can protrude horizontally from the exposed surface 54 and from the covered surface 56. The top ledge 60 can have a constant height, i.e., vertical distance downward from the top edge 48.

The outer lips 84 extend from the bottom edge 44 to the top ledge 60 along the left edge 50 and along the right edge 52. The thickness of the outer lips 84 can also be no greater than 4 inches, e.g., 2 inches. The outer lips can protrude horizontally from the covered surface 56 but not from the exposed surface 54. The outer lips 84 can have a constant width, i.e., horizontal distance inward toward the axis A from the left edge 50 or from the right edge 52.

The retaining wall 32 includes the bore 34. The bore 34 extends through the retaining wall 32 along a direction corresponding to the thickness of the retaining wall 32 from the covered surface 56 to the exposed surface 54. The bore 34 can be equally spaced from the left edge 50 and the right edge 52. The bore 34 has a circular cross-section.

The retaining wall 32 includes the collar 58. The collar 58 protrudes along the bore 34 from the covered surface 56. The thickness of the retaining wall 32 is greater at the collar 58 than at locations on the retaining wall 32 other than the collar 58. The collar 58 extends concentrically around the bore 34 and partially defines the bore 34. The collar 58 extends concentric with the tube body 40 and borders the tube body 40. The collar 58 can include a flat portion 62 extending concentrically around the bore 34 and a beveled portion 64 extending concentrically around the flat portion 62. The beveled portion 64 connects the flat portion 62 to the covered surface 56.

Some surfaces of the retaining wall 32 have a surface finish 66, and some surfaces of the retaining wall 32 lack the surface finish 66. The surface finish 66 is contouring and/or coloring to provide a desirable visual appearance, e.g., providing an appearance of masonry such as brick, stone, or another building material. For example, as seen in the Figures, the surface finish 66 can be flat portions and grooves providing the appearance of, respectively, bricks and mortar or grout between the bricks. Coloring can be achieved by, e.g., acidic staining. The surfaces that will be visible when the retaining wall assembly 30 is installed can have the surface finish 66, and the surface that will be concealed when the retaining wall assembly 30 is installed can lack the surface finish 66. The exposed surface 54 has the surface finish 66, and the covered surface 56 lacks the surface finish 66. The top edge 48, the right edge 52, and the left edge 50 can include the surface finish 66, and the bottom edge 44 can lack the surface finish 66. Lacking the surface finish 66 means that the surface is uncontoured and lacks coloring.

Figure 5:
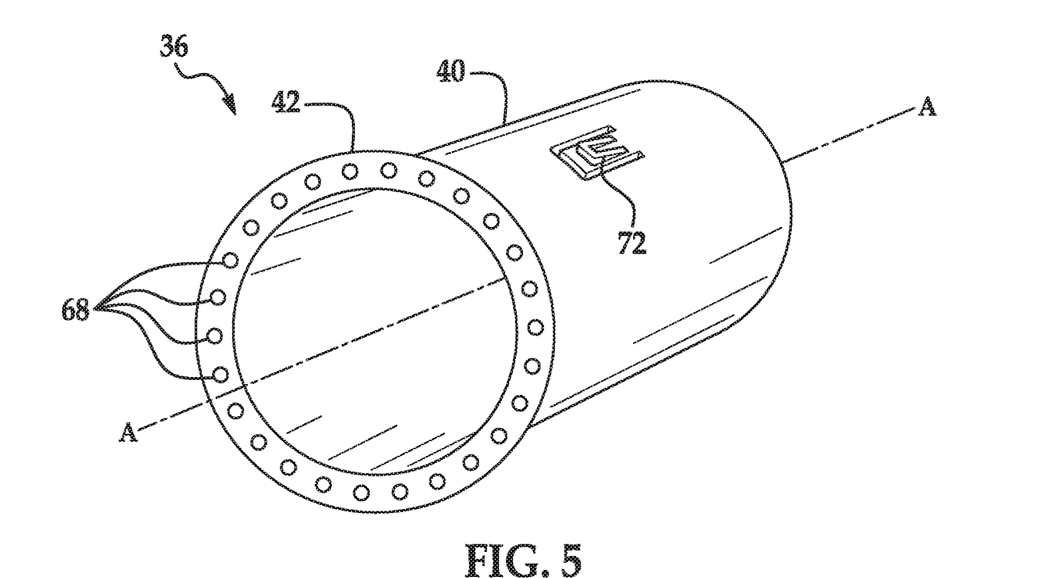
FIG. 5 is a perspective view of a cylindrical tube of the retaining wall assembly.

With reference to FIG. 5, the cylindrical tube 36 includes the tube body 40 and the flange 42. The cylindrical tube 36 defines an axis A around which the tube body 40 and flange 42 are centered. The cylindrical tube 36 is sized to fixedly fit to the culvert pipe 38. For example, an outer diameter of the tube body 40 can be approximately equal to or slightly smaller than an inside diameter of one of the standard sizes of the culvert pipe 38; i.e., the tube body 40 can be sized to insert into the culvert pipe 38 along the axis A but not substantially tilt with respect to the axis A once inserted into the culvert pipe 38. When the cylindrical tube 36 is inserted into the culvert pipe 38, the axis A defined by the cylindrical tube 36 is collinear with an axis defined by the culvert pipe 38.

The flange 42 extends radially outward from an axial end of the tube body 40. The flange 42 extends orthogonal from the tube body 40 radially outward to an outer diameter. The outer diameter of the flange 42 is concentric to the tube body 40, i.e., the flange 42 and the tube body 40 are both circular and centered on the axis A. The flange 42 has a platelike shape with a constant thickness, the thickness being along a direction parallel to the axis A. The flange 42 includes a plurality of perforations 68. The perforations 68 extend through the flange 42 in a direction parallel to the axis A. The perforations 68 can each have a circular cross-section.

Returning to FIGS. 3 and 4, the cylindrical tube 36 is fixed in the bore 34. Specifically, the flange 42 and a portion 70 of the tube body 40 immediately extending from the flange 42 are embedded in the retaining wall 32. The retaining wall 32 extends along both sides of the flange 42 and along the outside of the portion 70 of the tube body 40. The flange 42 maintains the cylindrical tube stationary relative to the retaining wall 32, i.e., helps prevent the cylindrical tube 36 from moving relative to the retaining wall 32, after the retaining wall assembly 30 is constructed, in addition to adhesion of the retaining wall 32 to the cylindrical tube 36. The material of the retaining wall 32 extends through the perforations 68. The perforations 68 can be used when constructing the retaining wall assembly 30 to ensure a proper position and orientation of the cylindrical tube 36 with respect to the retaining wall 32.

The cylindrical tube 36 is formed of a plastic such as acrylonitrile butadiene styrene (ABS). The cylindrical tube 36 can be black in color, which can disguise the appearance of the inside of the cylindrical tube 36 and of the culvert pipe 38 when the retaining wall assembly 30 is installed.

With reference to FIGS. 3-5, the cylindrical tube 36 includes a first flexible tab 72 and a second flexible tab 74 each extending axially along the tube body 40 and radially outward from the tube body 40. The first and second flexible tabs 72, 74 are flexible relative to the tube body 40, i.e., bend to a greater curvature than the tube body 40 given the same application of force. The first and second flexible tabs 72, 74 have a ramp-like shape, in particular, the first and second flexible tabs 72, 74 are sloped radially outward from the tube body 40 along an axial direction toward the retaining wall 32. The ramp-like shape causes the first and second flexible tabs 72, 74 to be flexed radially inward by pressure from the culvert pipe 38 when the cylindrical tube 36 is being inserted into the culvert pipe 38 and then to catch on one of the corrugations of the culvert pipe 38 to help prevent the cylindrical tube 36 from sliding out of the culvert pipe 38. The first and second flexible tabs 72, 74 are positioned at substantially the same position axially relative to the tube body 40, and the second flexible tab 74 is positioned circumferentially less than 180° from the first flexible tab 72 relative to the tube body 40, i.e., around the axis A. For example, as shown in the Figures, the first and second flexible tabs 72, 74 are positioned circumferentially 90° from each other around the axis A.

Figure 6:
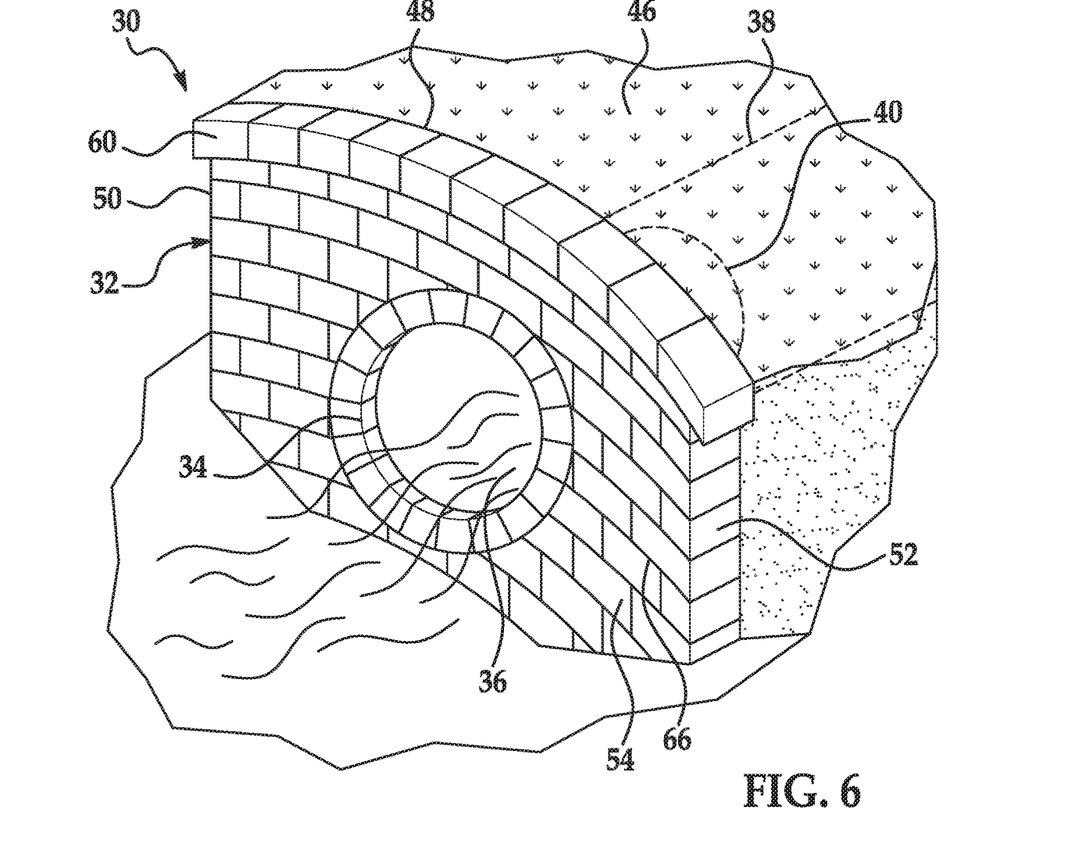
FIG. 6 is a perspective view of the retaining wall assembly installed to the culvert pipe.

With reference to FIG. 6, the retaining wall assembly 30 is fixedly fit to the culvert pipe 38. In particular, the cylindrical tube 36 is fixedly fit inside the culvert pipe 38. The cylindrical tube 36 may be designed (i.e., sized, shaped, and made of a selected material) to support the full weight of the retaining wall 32. The cylindrical tube 36, when fixedly fit inside the culvert pipe 38, supports up to a full weight of the retaining wall 32. Only native soil is provided below the bottom edge 44 of the retaining wall 32. When installed, the retaining wall 32 would sink deeper into the native soil without the support of the culvert pipe 38 via the cylindrical tube 36. The cylindrical tube 36 is sized to support the full weight of the retaining wall 32; i.e., the length and wall thickness of the tube body 40 and the outer diameter and thickness of the flange 42 are chosen so that supporting the full weight of the retaining wall 32 does not plastically deform the cylindrical tube 36.

Figure 7:
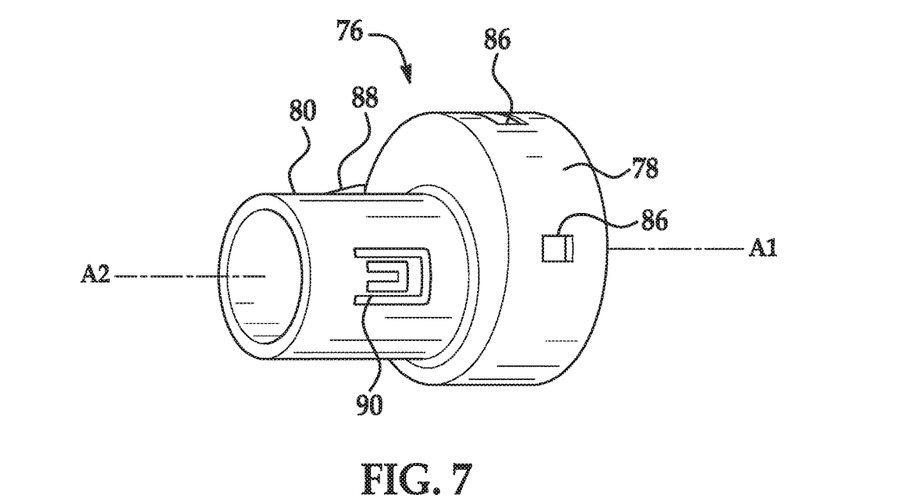
FIG. 7 is a perspective view of an adapter for the retaining wall assembly.
Figure 8:
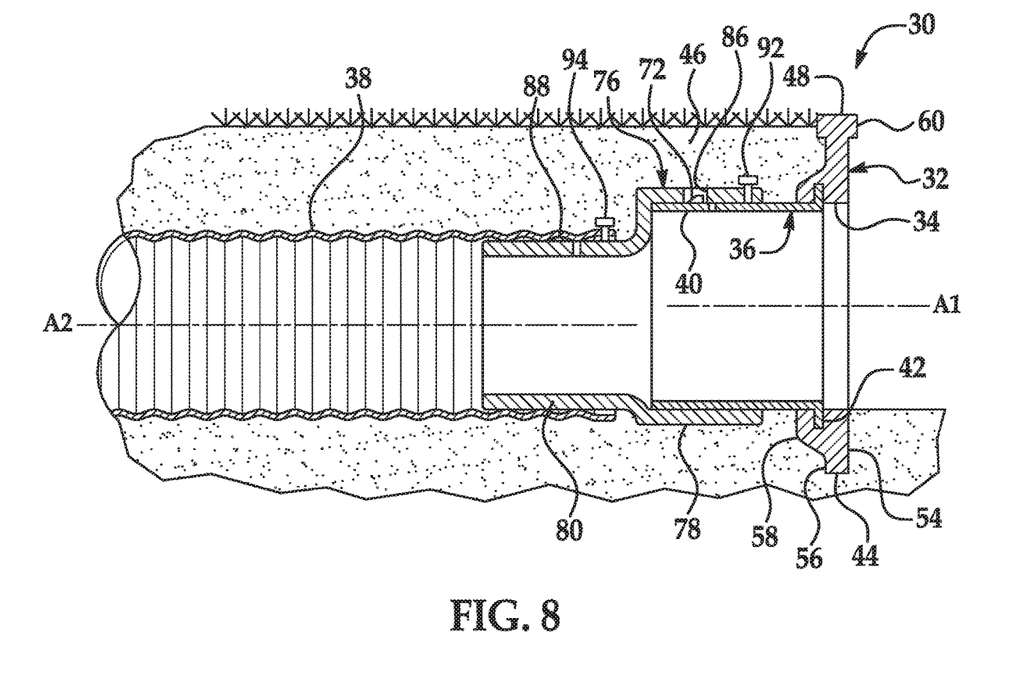
FIG. 8 is a cross-sectional view of the retaining wall assembly, the retainer, and the culvert pipe.

With reference to FIGS. 7 and 8, the retaining wall assembly 30 can include an adapter 76. The adapter 76 can fixedly fit the rest of the retaining wall assembly 30 to the culvert pipe 38. The adapter 76 includes a first tubular section 78 and a second tubular section 80. The first tubular section 78 is sized for the tube body 40 of the cylindrical tube 36 to fixedly fit inside. The second tubular section 80 is sized to fixedly fit to the culvert pipe 38, e.g., as shown in FIG. 8, to fixedly fit inside the culvert pipe 38. The first tubular section 78 defines a first axis A1, and the second tubular section 80 defines a second axis A2. The first axis A1 and the second axis A2 can be parallel to each other and offset from each other. The first axis A1 can be above the second axis A2. The first axis A1 can be the same as the axis A defined by the cylindrical tube 36, and the second axis A2 can be the same as the axis defined by the culvert pipe 38.

The first tubular section 78 can include two slots 86 positioned to receive the first and second flexible tabs 72, 74. The slots 86 are positioned circumferentially less than 180° from each other relative to the first tubular section 78, i.e., around the axis A1, e.g., positioned circumferentially 90° from each other around the axis A1.

The second tubular section 80 can include a third flexible tab 88 and a fourth flexible tab 90. The third and fourth flexible tabs 88, 90 are flexible relative to the second tubular section 80, i.e., bend to a greater curvature than the second tubular section 80 given the same application of force. The third and fourth flexible tabs 88, 90 have a ramp-like shape, as described above with respect to the first and second flexible tabs 72, 74. The third and fourth flexible tabs 88, 90 are positioned at substantially the same position axially relative to the second tubular section 80, and the fourth flexible tab 90 is positioned circumferentially less than 180° from the third flexible tab 88 relative to the second tubular section 80, i.e., around the axis A2. For example, as shown in FIG. 7, the third and fourth flexible tabs 88, 90 are positioned circumferentially 90° from each other around the axis A2.

With reference to FIG. 8, a first set screw 92 extends through the first tubular section 78 and presses against the tube body 40, and a second set screw 94 extends through the culvert pipe 38 and presses against the second tubular section 80. The set screws 92, 94 can help prevent the tube body 40, the adapter 76, and the culvert pipe 38 from moving axially or circumferentially relative to each other. If the adapter 76 is not used, the first set screw 92 can extend through the culvert pipe 38 and press against the tube body 40.

The retaining wall assembly 30 can be manufactured by molding. The mold can have a bottom corresponding to the exposed surface 54 and walls corresponding to the left edge 50, right edge 52, top edge 48, and bottom edge 44. The mold can be open on top. The mold can contain contouring corresponding to the surface finish 66 on the exposed surface 54, left edge 50, right edge 52, and top edge 48. The cylindrical tube 36 can be formed by, e.g., injection molding. The cylindrical tube 36 can be positioned relative to the mold corresponding to a position of the cylindrical tube 36 in the finished retaining wall assembly 30, i.e., a distance from the bottom of the mold equal to a distance from the exposed surface 54 of the retaining wall 32. A spacer can be positioned corresponding to the axial portion of the bore 34 not occupied by the cylindrical tube 36. The concrete, e.g., the GFRC, is poured into the mold and surrounds the cylindrical tube 36 and the spacer. The bottom of the mold is initially flat. After a set period of time, the mold can be curved corresponding to the horizontal curvature of the retaining wall 32. Additional concrete can be molded on top of the exposed surface 54 to form the collar 58, the back side of the top ledge 60, and the outer lips 84. Once the retaining wall 32 is fully cured, the retaining wall assembly 30 can be removed from the mold.

Figure 9:
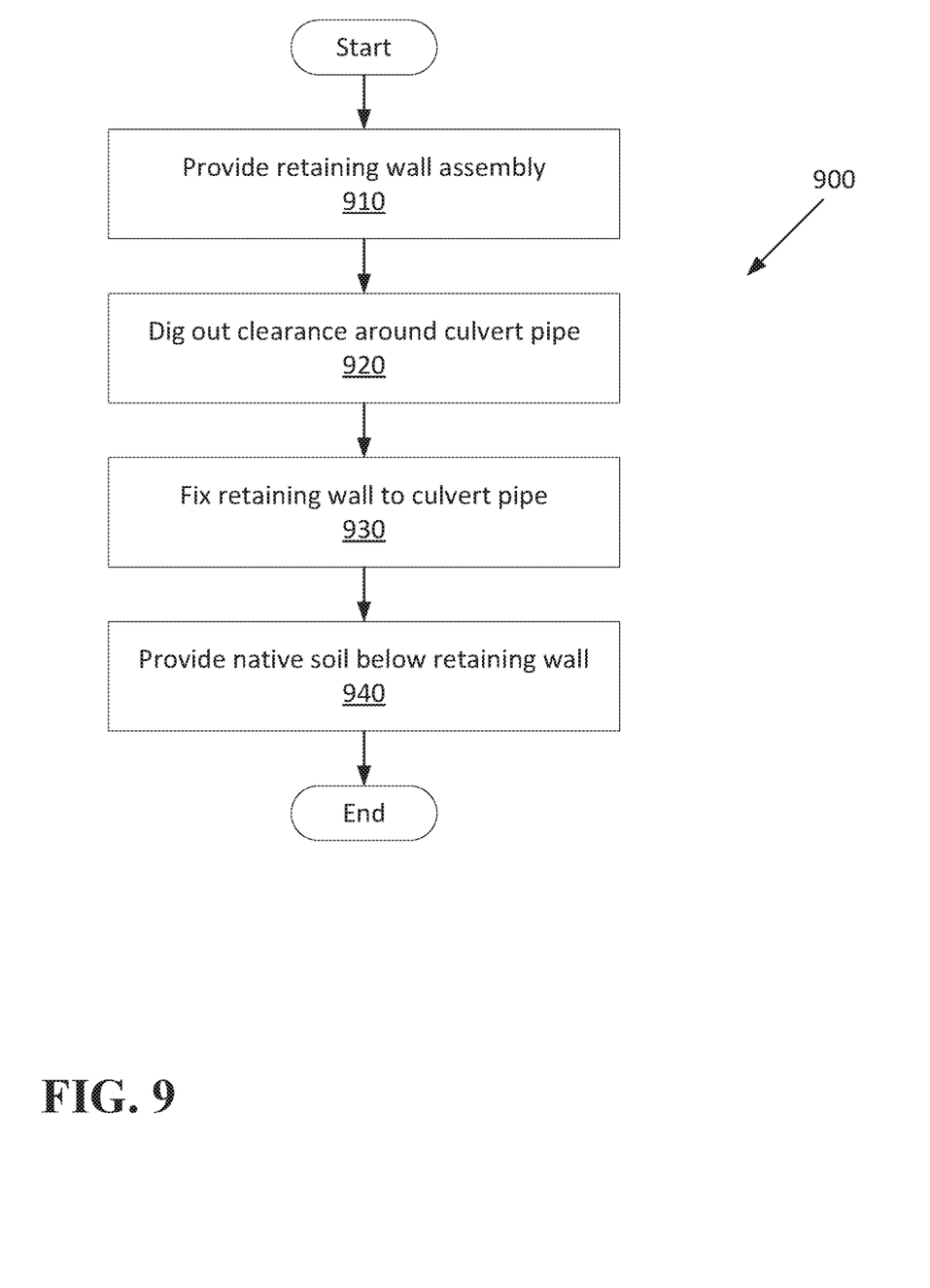
FIG. 9 is a process flow diagram of a process for installing the retaining wall assembly to the culvert pipe.

FIG. 9 is a process flow diagram of an exemplary process 900 for installing the retaining wall assembly 30 to the culvert pipe 38. The process 900 can be performed by a worker, who has either purchased the retaining wall assembly 30 or been hired by someone who purchased the retaining wall assembly 30. As a general overview of the process 900, the worker digs out a clearance 82 around the culvert pipe 38, fixes the retaining wall 32 to the culvert pipe 38, and fills in the space behind and underneath the retaining wall 32 with the native soil.

The process 900 begins in a block 910, in which the worker provides the retaining wall assembly 30, i.e., brings the retaining wall assembly 30 to the site of the culvert pipe 38. The retaining wall assembly 30 is available to the worker as a single piece with the cylindrical tube 36 fixedly attached to the retaining wall 32. The weight of the retaining wall assembly 30 is such that one or two workers can lift and carry the retaining wall assembly 30. The adapter 76 can be optionally included based on the size of the culvert pipe 38.

Next, in a block 920, the worker digs out the native soil to form a clearance 82 around the culvert pipe 38, as shown in FIG. 1. For the purposes of this disclosure, "native soil" is defined as the soil already present in a geographic area before installation of the retaining wall assembly 30. The clearance 82 is empty space that the retaining wall assembly 30 can occupy once installed; i.e., the retaining wall assembly 30 can be fixedly fit to the culvert pipe 38 without interference from the obstruction 46.

Next, in a block 930, the worker fixes the retaining wall assembly 30 to the culvert pipe 38. The worker inserts the cylindrical tube 36 into the culvert pipe 38. The cylindrical tube 36 is sized to fixedly fit to the culvert pipe 38. The outer diameter of the tube body 40 is not greater than the inner diameter of the culvert pipe 38, and the outer diameter of the tube body 40 plus a height of one of the first and second flexible tabs 72, 74 radially outward from the outer diameter of the tube body 40 is greater than the inner diameter of the culvert pipe 38. The first and second flexible tabs 72, 74 can prevent the cylindrical tube 36 from backing out of the culvert pipe 38 after insertion. Alternatively, the worker can use the adapter 76 to fix the rest of the retaining wall assembly 30 to the culvert pipe 38, inserting the tube body 40 into the first tubular section 78 of the adapter 76 so that the first and second flexible tabs 72, 74 lock into the slots 86, and inserting the second tubular section 80 of the adapter 76 into the culvert pipe 38. The third and fourth flexible tabs 88, 90 can prevent the adapter 76 from backing out of the culvert pipe 38 after insertion. Whether or not the adapter 76 is used, the first set screw 92 or the set screws 92, 94 can be screwed into place to help prevent the cylindrical tube 36 from moving relative to the culvert pipe 38. Once the cylindrical tube 36 is fixed to the culvert pipe 38, the retaining wall assembly 30 is in its final position relative to the culvert pipe 38 and relative to the obstruction 46.

Next, in a block 940, the worker partially fills in the clearance 82 around the retaining wall assembly 30. The worker uses the native soil, in particular, the native soil removed from the obstruction 46 while digging out the clearance 82. The worker provides the native soil directly below the bottom edge 44 of the retaining wall 32, covers the culvert pipe 38, and fills in behind the retaining wall 32, i.e., covering the covered surface 56 of the retaining wall 32. Because the cylindrical tube 36 can support the full weight of the retaining wall 32, gravel or other load-bearing materials are not needed underneath the retaining wall 32. After the block 940, the process 900 ends.

The disclosure has been described in an illustrative manner, and it is to be understood that the terminology which has been used is intended to be in the nature of words of description rather than of limitation. "Substantially" as used herein means that a dimension, time duration, shape, or other adjective may vary slightly from what is described due to physical imperfections, power interruptions, variations in machining or other manufacturing, etc. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A retaining wall assembly, comprising:
   a concrete retaining wall including an exposed surface, a covered surface opposite the exposed surface, and a bore extending from the exposed surface to the covered surface; and
   a cylindrical tube fixed in the bore and sized to fixedly fit to a culvert pipe;
   wherein the retaining wall is concrete continuously from the exposed surface to the covered surface;
   the cylindrical tube includes a tube body and a flange extending radially outward from the tube body; and
   the flange is embedded in the retaining wall.

2. The retaining wall assembly of claim 1, wherein the cylindrical tube and the retaining wall are sized to permit the cylindrical tube to support a full weight of the retaining wall.

3. The retaining wall assembly of claim 1, wherein the cylindrical tube is sized to fixedly fit inside the culvert pipe.

4. The retaining wall assembly of claim 1, wherein the flange extends orthogonal from the tube body radially outward to an outer diameter, the outer diameter concentric to the tube body.

5. The retaining wall assembly of claim 1, wherein the flange includes a plurality of perforations.

6. The retaining wall assembly of claim 5, wherein the cylindrical tube defines an axis, and the perforations extend through the flange in a direction parallel to the axis.

7. The retaining wall assembly of claim 1, wherein the retaining wall is glass-fiber-reinforced concrete.

8. The retaining wall assembly of claim 1, wherein the retaining wall is curved in a horizontal direction.

9. The retaining wall assembly of claim 8, wherein the retaining wall is straight in a vertical direction.

10. The retaining wall assembly of claim 1, wherein the retaining wall includes a collar extending concentric with and bordering the tube body.

11. The retaining wall assembly of claim 10, wherein a thickness of the retaining wall other than at the collar is no greater than 4 inches.

12. The retaining wall assembly of claim 1, wherein the cylindrical tube includes a flexible tab extending axially along the tube body and radially outward from the tube body.

13. The retaining wall assembly of claim 12, wherein the flexible tab is a first flexible tab, the cylindrical tube includes a second flexible tab extending axially along the tube body and radially outward from the tube body, and the second flexible tab is positioned circumferentially less than 180° from the first flexible tab relative to the tube body.

14. The retaining wall assembly of claim 1, further comprising an adapter including a first tubular section and a second tubular section, wherein the first tubular section is sized for the tube body to fixedly fit inside, and the second tubular section is sized to fixedly fit to the culvert pipe.

15. The retaining wall assembly of claim 14, wherein the first tubular section defines a first axis, the second tubular section defines a second axis, and the first axis and second axis are parallel to each other and offset from each other.

16. The retaining wall assembly of claim 1, wherein the exposed surface of the retaining wall has a surface finish providing an appearance of masonry.

17. The retaining wall assembly of claim 1, wherein the retaining wall is a single piece without internal seams.

18. The retaining wall assembly of claim 16, wherein the surface finish includes acidic staining.

* * * * *